May 13, 1958
C. E. OHLHEISER
2,834,201
APPARATUS FOR MEASURING HUMIDITY
CONDITIONS IN MATERIALS
Original Filed Nov. 3, 1948
2 Sheets-Sheet 2
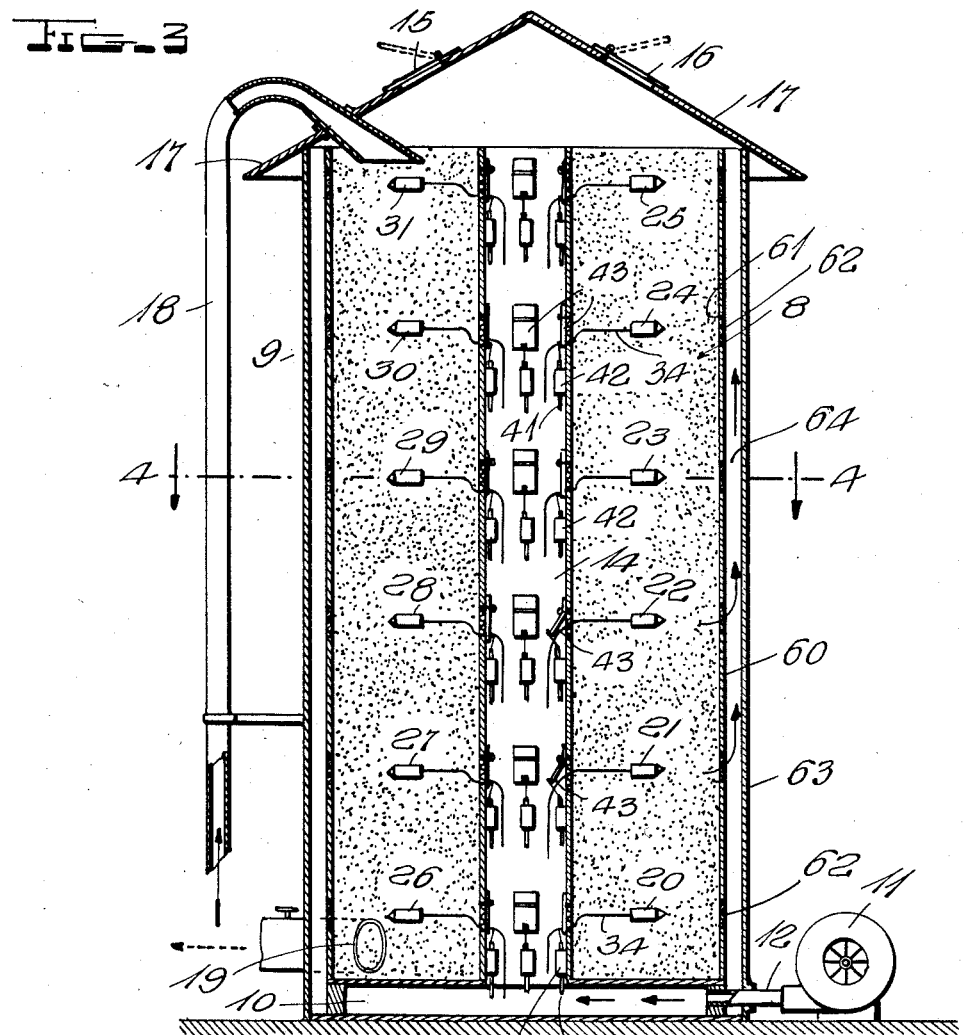
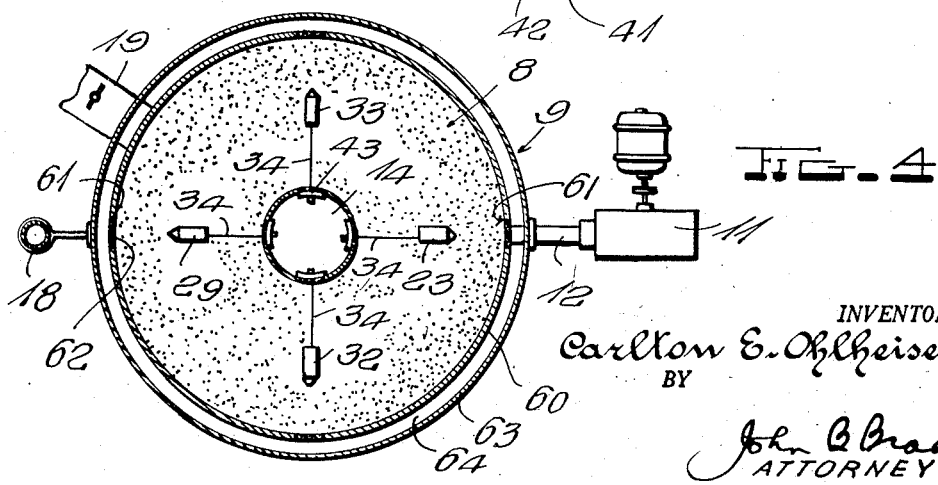
INVENTOR.
Carlton E. Ohlheiser,
BY
John B. Brady
ATTORNEY United States Patent Office 2,834,201
Patented May 13, 1958

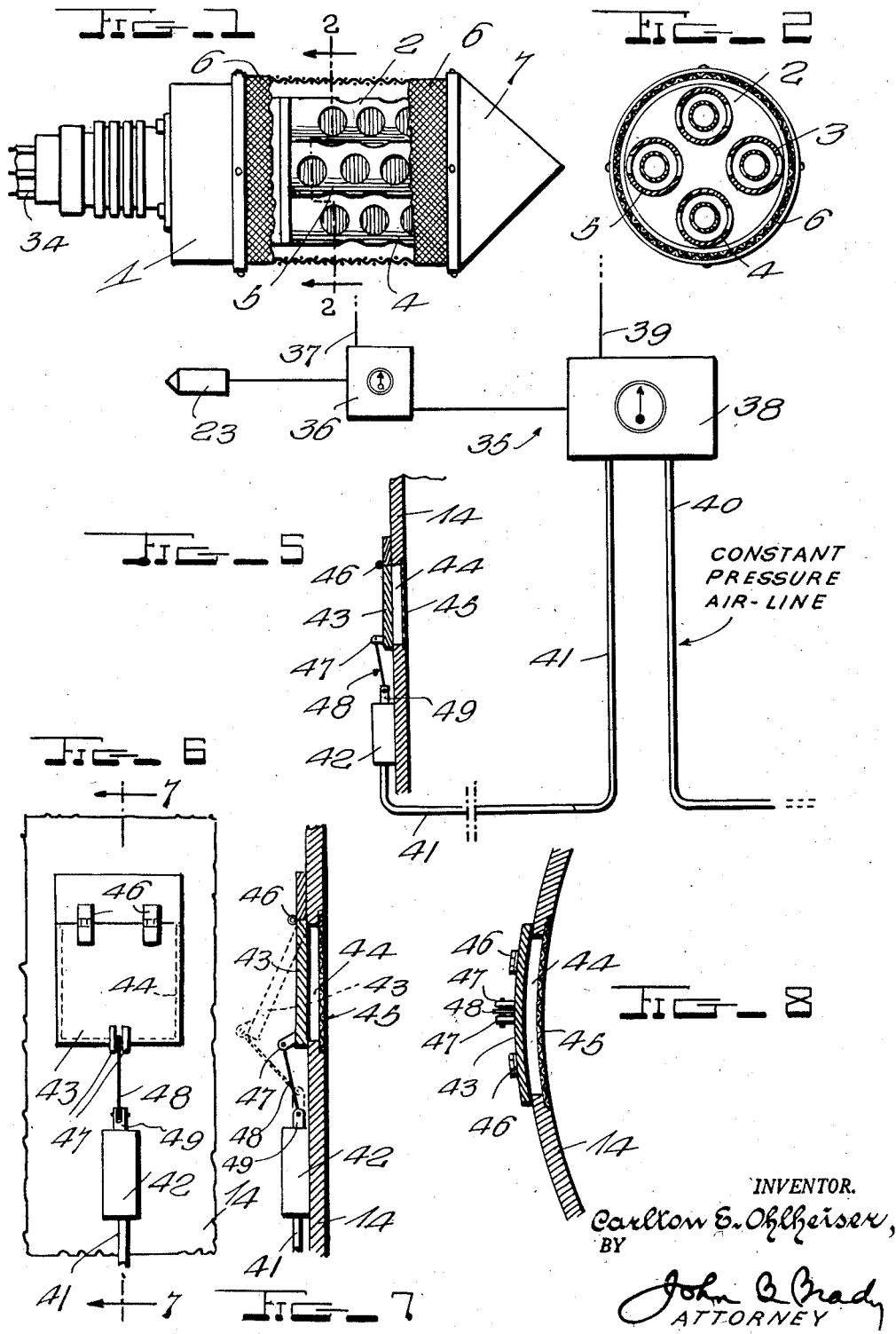

2,834,201

APPARATUS FOR MEASURING HUMIDITY CONDITIONS IN MATERIALS

Carlton E. Ohlheiser, Silver Spring, Md., assignor to The American Instrument Company, Silver Spring, Md., a corporation of Maryland Original application November 3, 1948, Serial No. 58,146, now Patent No. 2,655,734, dated October 20, 1953. Divided and this application October 16, 1953, Serial No. 386,498

5 Claims. (Cl. 73—73)

My invention relates broadly to humidity control systems, and more particularly to an apparatus for the precision control of humidity in materials.

This application is a division of my application Serial Number 58,146 filed November 3, 1948, for Method and Apparatus for Controlling Humidity Conditions in Bulk Materials, now Patent 2,655,734, dated October 20, 1953.

One of the objects of my invention is to provide an apparatus responsive to conditions of humidity existent in material such as grain, soap, granular bromides, malt, and other confined and granular materials.

Another object of my invention is to provide control means for maintaining grain and other granular materials at proper conditions of humidity for preservation of the grain or granular material, and the prevention of spoilage thereof.

Another object of my invention is to provide an arrangement for distributing humidity control devices throughout the area of granular bodies for detecting changes in humidity conditions and automatically controlling by such changes compensation means for maintenance of proper conditions of humidity necessary to the preservation of the granular material.

Still another object of my invention is to provide control means operative under conditions of changes in humidity in material for operating forced draft equipment for blowing air through the material for compensating for undesirable conditions of humidity and restoring the granular material to a proper humidity condition for the proper preservation thereof.

Other and further objects of my invention reside in an apparatus for maintaining granular material under conditions of substantially constant humidity, as set forth more fully in the specification hereinafter following, by reference to the accompanying drawings, in which:

Fig. 1 is a side elevational view of one of the humidity sensing elements employed in the system of my invention, the view being particularly broken away for indicating the individual sensing elements, employed in the system of my invention; Fig. 2 is a transverse sectional view through the humidity sensing device taken substantially on line 2—2 of Fig. 1; Fig. 3 illustrates the application of the humidity sensing device of my invention to a grain storage silo wherein a multiplicity of the humidity sensing devices of Figs. 1 and 2 are distributed throughout the area of the grain storage silo and become buried in the grain therein and serve as detectors of humidity conditions in the bulk grain; Fig. 4 is a transverse sectional view taken substantially on line 4—4 of Fig. 3; Fig. 5 is a schematic view illustrating the manner in which the humidity sensing device controls the distribution of compensating air through the grain in the grain storage silo of Figs. 3 and 4; Fig. 6 is an enlarged elevational view of one of the detectors for controlling the flow of humidity compensating air through the grain storage silo; Fig. 7 is a vertical sectional view taken substantially on line 7—7 of Fig. 6; and Fig. 8 is a detail view showing the mechanization for controlling the position of the damper in the humidity compensating system employed in the grain storage silo of Figs. 3 and 4.

Referring to the drawings in detail, reference character 1 designates a supporting head or device for a plurality of individual humidity sensing elements which I have designated at 2, 3, 4 and 5 supported by head 1. Individual humidity sensing elements are protected by a foraminated casing or guard 6 to which there is attached a conical shaped end or hood 7. The foraminated casing or guard 6 protects the humidity sensing elements 2, 3, 4, and 5 from direct contact with grain, molding sand, soap, bromide granular material or other granular material while enabling the sensing elements to be thrust into the granular material and buried therein by means of the conical shaped end or hood 7. The humidity sensing elements may thus be located within the granular material in positions which will detect true humidity conditions therein because the humidity sensing elements are sufficiently spaced from the inside of the foraminated casing or guard 6 to enable the moisture present in the gases surrounding the material in which the device is inserted to circulate into contact with the humidity sensing elements. In Figs. 3 and 4 I have shown the application of my invention to the protection of grain 8 stored in the grain storage silo 9. The grain storage silo 9 includes a base support 10 beneath which a forced draft of air is induced from fan 11 to conduit 12 and directed upwardly through the central duct indicated at 14 and discharged through the air vents designated at 15 and 16 in the roof 17 of the silo 9. The grain 8 is delivered to the silo 9 in conventional manner through a suitable delivery conveyor tube 18 and is discharged in a similarly conventional manner through discharge opening 19. When the silo is not being filled the conveyor tube 18 is closed off by a suitable valve not shown. The grain is divided into horizontal sectional areas throughout the entire vertical height of the silo and each of these areas is protected by a humidity sensing element which is buried in the grain as represented at 20, 21, 22, 23, 24 and 25 and at 26, 27, 28, 29, 30 and 31 in Fig. 3. In horizontal plan view the distribution of these humidity sensing elements is as set forth in Fig. 4 where two other columns of humidity sensing elements are buried in the grain at spaced intervals throughout the height of the grain storage silo as represented by humidity sensing elements 32 and 33.

The electrical conductors leading from the humidity sensing elements through the head 1 therein are brought out from each of the humidity sensing elements at the position 34 represented in Fig. 1, and shown schematically in Fig. 3. The conductors leading from the sensing elements are carried to a control panel from which the operation of the silo is regulated. Fig. 5 represents the equipment for each of the sensing control units on the control panel. The humidity sensing element 23 electrically connects with the hygrometer equipment represented generally at 35 including an indicator schematically shown at 36 which electrically responds to the humidity sensing element 23. The indicator 36 is supplied with power from the conventional 115 volt power line which I have indicated as a source 37, power from which is controlled by sensing element 23 to operate the pneumatic recorder controller shown schematically at 38. The pneumatic recorder controller is also supplied with 115 volt power through power line connection 39. A constant pressure air line 40 connects with the pneumatic recorder controller 38 and supplies the continuous pressure at approximately 17 p. s. i. This pressure is controlled through the control pressure air line represented at 41 which extends upwardly through the air duct 14 immediately adjacent the interior wall thereof leading to the air pressure damper motor schematically shown at 42. The air pressure damper motor 42 serves to control the movement of damper or valve 43 which normally closes the opening 44 in the side of the air duct 14 of the silo. Opening 44 is closed by an open mesh screen 45 which permits passage of air currents when damper 43 is open but which prevents the loss of grain through the wall of the silo when the damper 43 is open.

Opening 44 is representative of similar openings at different horizontal levels throughout the silo. In the outer wall 60 of the silo openings 61 are arranged at the same horizontal levels as openings 61 and covered by screens 62 to prevent loss of the grain. The outer wall 60 is surrounded by the spaced jacket 63 forming an annular stack 64 around the silo for the passage of air upwardly from the openings 61 to the air vents 15 and 16.

The damper or valve 43 is hinged at the top thereof through hinges 46 and normally gravitationally closes the opening 44. The lower edge of damper or valve 43 has a pair of lugs 47 thereon which are connected through link 48 with plunger 49 of the air pressure damper motor 42. Increase in air pressure in the controlled pressure air line 41 operates air pressure damper motor 42 to angularly shift damper 43 to the dotted line position 43' illustrated in Fig. 7 restricting the flow of air through the duct 14 and diverting the air into substantially horizontal paths through the bulk grain 8 thus directing the passage of air currents through the protected section of the silo which through the operation of the humidity sensing element 23 calls for air for compensating for an abnormal humidity condition.

The dampers 43 all open outwardly into the duct 14 from the top hinged connections thereof with the interior wall of the duct 14 so that the dampers serve as deflectors for the upwardly moving air and skim off and divert quantities of the air for distribution through the bulk grain 8. The arrangement of the openings 61 in the wall 60 of the silo substantially horizontally aligned with the dampers 43 insure the passage of the air in substantially horizontal paths through the bulk grain 8 and the discharge of the air upwardly within the annular slack 64 between the wall 60 and the jacket 63 surrounding the wall 60 in spaced relation thereto.

The several pressure air lines 41 extending from damper motors 42 are grouped around the side wall of the central air duct 14 and lead to the equipment shown in Fig. 5 at the central control board.

By dividing the silo into horizontally localized areas as illustrated in Figs. 3 and 4, dangerous conditions of humidity which may develop in the protected areas throughout the silo are promptly detected on the indicator 36 and the condition recorded on the pneumatic recorder controller 38 and immediately corrected by the supplying of compensating quantities of air by the opening of the individual damper or valve 43 controlled by the adjacent humidity sensing element.

Abnormal conditions of humidity which may occur in any area of the grain within the silo may produce a condition of spoilage which might spread throughout a large portion of the silo with a resulting loss of the grain. However, by proper distribution of the humidity sensing elements throughout the grain, compensating dry air may be supplied over a sufficient time period at each of the danger zones to eliminate the dangerous condition of humidity before the grain can be appreciably injured.

I have found the apparatus of my invention highly practical in the protection of materials and in the determination of the characteristics thereof, and while I have described my invention in certain of its preferred embodiments, I realize that modifications and changes may be made, and I desire that it be understood that no limitations upon my invention are intended other than may be imposed by the scope of the appended claims.

What I claim as new and desire to secure by Letters Patent of the United States is as follows:

1. Apparatus for measuring conditions of humidity in material comprising a device constituting a cylindrical hood structure insertable into the material for forming an air pocket therein, a support for a multiplicity of humidity sensing elements carried interiorly of said hood, a multiplicity of selectively removable and replaceable humidity sensing elements mounted on said support, said hood structure being perforated to permit the moisture in the air surrounding the material in which the device is inserted to circulate in contact with the humidity sensing elements, electrical measuring apparatus, and connections from said humidity sensing elements through said support with said electrical measuring apparatus for impressing upon said measuring apparatus control currents integrated from each of said humidity sensing elements.

2. Apparatus for measuring conditions of humidity in material which comprises a device constituting a hood forming a pocketlike enclosure, penetrating means on the hood for effecting a forceful entry into the material for determination of humidity conditions therein, a plurality of electrical sockets disposed interiorly of one end of said hood, electrical humidity sensing elements independently mounted in said sockets, said elements being selectively insertable into and replaceable with respect to said sockets, said hood being perforated to permit the moisture in the air surrounding the material in which the device is inserted to circulate in contact with the humidity sensing elements, electrical connections from said sockets extending exteriorly of said hood, and electrical current indicating means electrically connected with said connections for indicating changes in electrical conditions developing in said electrical humidity sensing elements due to changes in humidity arising in the material in which said hood is inserted.

3. Apparatus for measuring conditions of humidity in material comprising a device having a flat circular base, a plurality of sockets arranged in spaced positions on said base, independent cylindrical humidity sensing elements removably mounted in said sockets and projecting on mutually parallel axes normal to said base to substantially the same linear distance therefrom, said cylindrical humidity sensing elements being located in spaced relation to each other for the circulation of gases therearound, foraminated guard means carried by said base and encircling all of said cylindrical humidity sensing elements and preventing contact between said elements and the material into which said guard means is thrust while allowing the moisture present in the gases surrounding the material in which the device is inserted to circulate into contact with the humidity sensing elements, and electrical measuring apparatus connected with said humidity sensing elements for measuring the integrated response to the effect of changes in humidity in all of said humidity sensing elements.

4. Apparatus for measuring conditions of humidity in material comprising a device having a circular base structure, means for securing electrical terminals on one side of said base, means for supporting a multiplicity of humidity sensing elements on the other side of said base in mutually spaced relation for the circulation of gases therebetween, said elements each extending from said base for substantially the same linear distance on axes parallel to each other, foraminated guard means carried by said base and enclosing all of said humidity sensing elements in spaced relation thereto for protecting said humidity sensing elements from contact with material into which said guard means is thrust while allowing the moisture present in the gases surrounding the material in which the device is inserted to circulate into contact with the humidity sensing elements, and electrical connections extending from each of said humidity sensing elements to the electrical terminals on the exterior of said base and electrical measuring apparatus connected with said terminals for measuring the integrated response to the effect of changes in humidity in all of said humidity sensing elements.

5. Apparatus for measuring conditions of humidity in material comprising a flat circular base, a plurality of individual humidity sensing elements mounted on said base and projecting therefrom on lineal axes substantially parallel one to the other and for substantially the same distance from said base, said humidity sensing elements being sufficiently spaced for the circulation of gases therearound, a cylindrical foraminated casing connected with said base and extending on an axis normal thereto surrounding said humidity sensing elements and terminating at a position spaced from said base in a lateral plane approximately in the plane of the terminating end of said humidity sensing elements, said foraminated casing being open at said terminating end to permit the insertion and removal of the individual humidity sensing elements, a detachable cap closing the terminating end of said foraminated casing, said humidity sensing elements being connected through said base to connecting means attached to the exterior of said base, and electrical measuring apparatus connected to said connecting means for measuring the integrated response to the effect of changes in humidity in all of said humidity sensing elements.

References Cited in the file of this patent

UNITED STATES PATENTS

| | | |
|---|---|---|
| 2,105,683 | Burdick | Jan. 18, 1938 |
| 2,342,553 | Olpin | Feb. 22, 1944 |

FOREIGN PATENTS

| | | |
|---|---|---|
| 540,783 | France | Apr. 22, 1922 |
| 533,381 | Great Britain | Feb. 12, 1941 |